Sept. 28, 1937. J. A. DUNN Re. 20,519
SERVICE STATION
Original Filed Aug. 24, 1931
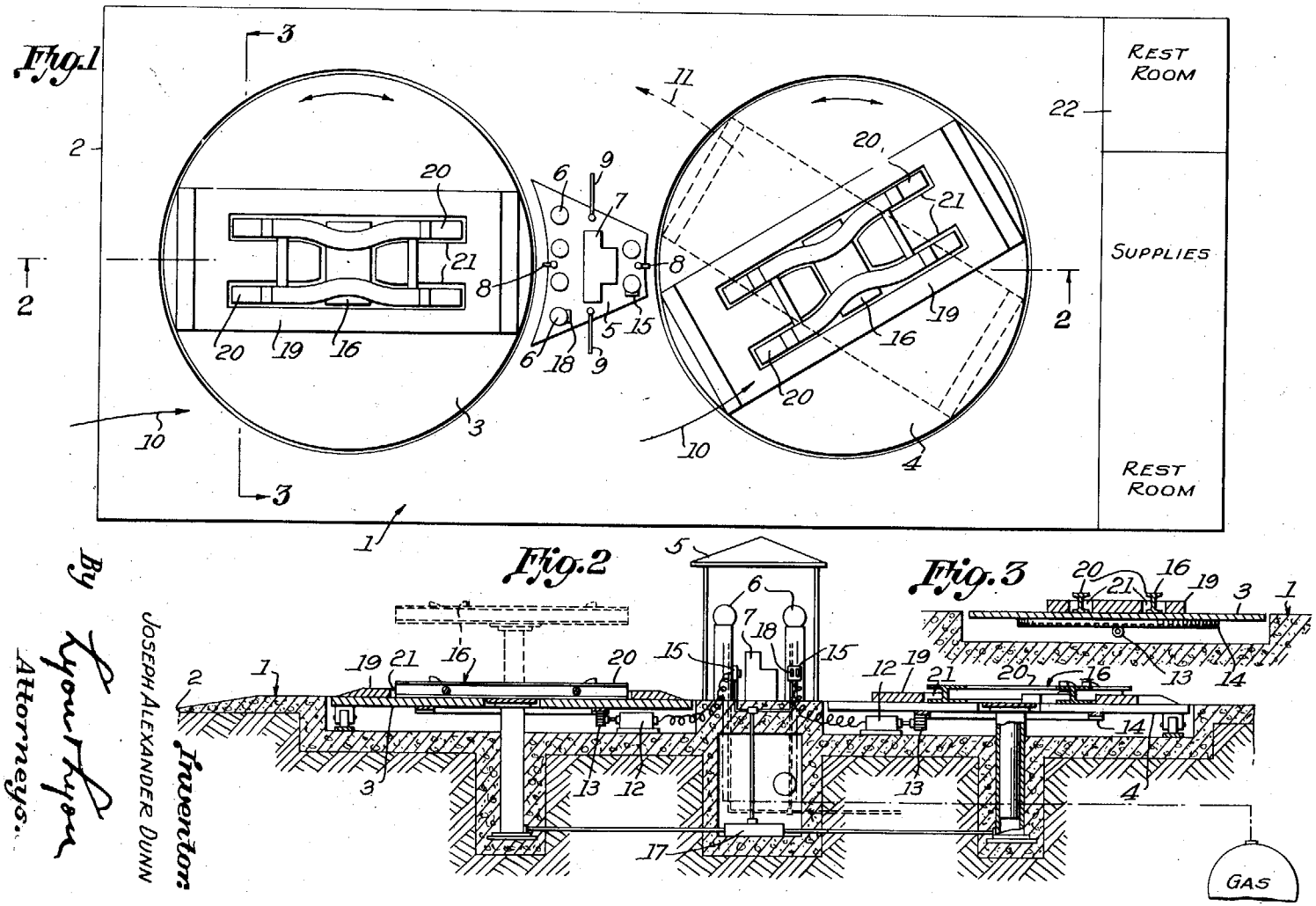
Inventor:
JOSEPH ALEXANDER DUNN
By Lyon & Lyon
Attorneys.

Reissued Sept. 28, 1937

Re. 20,519

UNITED STATES PATENT OFFICE 20,519

SERVICE STATION

Joseph Alexander Dunn, Los Angeles, Calif.

Original No. 1,858,438, dated May 17, 1932, Serial No. 559,001, August 24, 1931. Application for reissue May 7, 1934, Serial No. 724,446

16 Claims. (Cl. 104—44)

This invention relates to service stations, and more particularly to a service station for the dispensing of motor vehicle products such as gasoline, oil, air, water and the like, and which is of such a construction as to be applicable to and operable upon a minimum area of ground.

The cost of petroleum products, particularly gasoline and oil, to the ultimate consumer is greatly enhanced due to the present method of distributing such petroleum products. One of the greatest elements entering into the cost of distribution of petroleum products through service stations is the high rents which must be paid for the area of ground utilized in the operation and maintenance of these service stations. Another great item of expense in the distribution of gasoline and oil from service stations is the large labor charges occasioned by the present system of operation. The public has become so accustomed to the ease of obtaining petroleum products through this system of distribution that its elimination at the present time is practically impossible. It is therefore imperative that some means be provided whereby the overhead and labor charges incident to the distribution of gasoline and oil through service stations be reduced.

It is therefore the object of my invention to provide a service station which is so designed, constructed and operated that it may be maintained on a relatively small area of ground and which, when so positioned, will offer no disadvantage to the purchasing public in obtaining their petroleum products from such a service station.

Another object of my invention is to provide a service station which includes a turntable upon which the motor vehicle to be serviced is adapted to be driven and which turntable is positioned with relation to a dispensing station so that the motor vehicle, while retained upon the turntable, may be completely serviced and then moved in position to leave the service station without requiring any effort upon the part of the driver of the motor vehicle.

Another object of my invention is to provide a service station which is maintainable upon a minimum area of ground and which includes a plurality of turntables positioned with relation to a centrally disposed dispensing station, and which turntables are so proportioned and positioned that one table offers no obstruction to the use of the other table or tables, permitting at all times free manipulation of the motor vehicles upon the parcel of land utilized by the service station, and which turntables are so positioned with relation to the centrally disposed distributing station that the motor vehicles as mounted on the turntables may be freely manipulated by the operators so that all service of the cars may be rendered while the motor vehicles are positioned upon the turntables.

Another object of my invention is to provide a service station which includes a turntable upon which a car to be serviced is adapted to be driven, and which turntable is provided with a novel surface in which there is embedded a lifting hoist enabling the motor vehicle upon the turntable to be elevated in its position with relation to a centrally disposed distributing station for the purpose of greasing, lubricating the vehicle, making repairs therein, or for draining of the lubricant from the crank case or other portions of the motor vehicle.

Other objects and advantages of this invention it is believed will be apparent from the following detailed description of a preferred embodiment thereof as illustrated in the accompanying drawing.

In the drawing:

Figure 1 is a plan view of a service station embodying my invention.

Figure 2 is a side elevation, taken on the line 2—2 of Figure 1, mainly in vertical mid-section of the service station illustrated in Figure 1.

Figure 3 is a detached sectional view of the turntable taken on the line 3—3 of Figure 1, particularly in vertical section, taken at right-angles to the sectional view illustrated in Figure 2.

In the preferred embodiment of my invention illustrated in the accompanying drawing, 1 indicates a parcel of land upon which it is desired to operate and maintain a service station. It is essential that this parcel of land be reduced to a minimum number of square feet, particularly on the street frontage side 2 thereof, so that the rent which such a service station must pay may be reduced as far as possible.

It is also essential that the service station which is maintained and operated on the parcel of land be so constructed and operated so as not to materially or in any way interfere with the service rendered the public if such service station is to be maintained and operated.

In order to operate and maintain the service station on the parcel of land 1 so as not to interfere with the operation or manipulation of the motor vehicles upon this parcel of land as they are serviced with gasoline and oil, the principal products sold at such service stations, and also so that they may be serviced with water and air, or given such other service as may be required or desired by the driver of the motor vehicle, I provide on the parcel of land a plurality of turntables 3 and 4 which are positioned on either side of a centrally disposed distributing station 5.

Motor vehicles in length and width are of such maximum dimensions as to enable me to operate the service station on the parcel of land, the street frontage of which need not exceed 25 feet by the positioning of the two turntables 3 and 4 one to the rear of the other, between which the distributing station 5 is positioned.

This enables the free turning of the motor vehicles of the greatest length and their free manipulation upon the area of land as when the motor vehicle positioned on the turntable 3 is positioned with its longitudinal sides perpendicular to the street side 2, the motor vehicles desiring access to or from the turntable 4 situated at the rear may be manipulated upon either side of the motor vehicle positioned on the turntable 3.

The turntable 3 is preferably positioned at the forward end of the lot or area of land 1 so that a motor vehicle may be driven straight onto this turntable in proper position with relation to the distributing station 5 upon which are mounted the gasoline pumps 6, the oil racks 7, water supply means 8, and the air hoses 9. The distributing station 5 is so positioned that as the motor vehicle is driven onto the turntable 3, the forward end of the motor vehicle is immediately adjacent the distributing station 5. In this position the motor vehicle may be serviced with water and oil and the forward tires may be inflated with air from the hoses 9. The turntable 3 is then rotated through 180° and the rear of the car is then in position adjacent the distributing station 5. The motor vehicle may then be serviced with gasoline and the operator is in position to leave the service station.

While the motor vehicle is being serviced on the turntable 3, another motor vehicle may enter the service station to the right of the motor vehicle on the turntable 3 in a direction as indicated by the arrow 10 and may proceed to its position upon the turntable 4. In this position on the turntable 4 the rear of the motor vehicle is in position adjacent the distributing station 5 so that this motor vehicle is in position to be serviced with gasoline, if it be of the type carrying the gasoline tank in the rear of the chassis. After the required amount of gasoline has been placed in the tank of the motor vehicle on the turntable 4, the turntable 4 is rotated through approximately 135° where it is in position to leave the service station in the direction of the arrow 11, the forward end of the car being headed toward the street.

In this position the motor vehicle on the turntable 4 may be serviced from the distributing station 5 with water and oil, and in the two different positions the motor vehicle on the turntable 4 may have its tires inflated as desired. The motor vehicles on both turntables are serviced from the central distributing station 5 and are serviced more or less in alternate relation so that as one car is receiving gasoline, the other car is receiving oil and water and vice versa, so that one operator is enabled to operate and maintain the service required of such a service station.

This is due to a considerable degree to the fact of the location of the central distributing station 5 and to the fact that the operator does not have to move from one station to another in order to service the motor vehicles as they are positioned upon the lot.

In leaving the service station, the motor vehicle from the turntable 4 passes to the left of the motor vehicle positioned on the turntable 3 and out into the street.

The turntables 3 and 4 are rotated from controls positioned within distributing station 5 which are controlled by the operator of the service station so that the occupant or driver of the motor vehicle is required to do nothing while being serviced at the service station.

The turntables 3 and 4 may be rotated in any suitable or desirable manner, and I have herein illustrated for the purpose of rotating the tables 3 and 4 reversible electric motors 12, the drive shafts of which are provided with pinions 13 which mesh with gears 14 carried on the under surface of the table 4. The controls 15 for operating and reversing the operation of the motors 12 are carried in the distributing station 5.

In order that the motors 12 may be operated and stopped in the correct position, I prefer to provide such motors with solenoid brakes which are operated from the controls 15 to arrest the turntables 3 and 4 in the proper position upon the lot 1.

In order that the motor vehicles on the turntables 3 and 4 may be completely serviced in any manner required by the operator of such motor vehicle, the turntables 3 and 4 are equipped with hoists 16 which may be of any suitable or desirable construction but which are preferably hydraulically operated from an air cylinder 17. The controls for operating the hydraulic hoists 16 are indicated at 18 as positioned within the distributing station 5.

An important feature of my invention is the construction of the tops of the turntables 3 and 4 in order that the operator of the motor vehicle may have definite guides for the position of his motor vehicle thereon. In order to accomplish this result, the turntable tops are provided with raised portions 19 which serve as an indicator to the driver of the motor vehicle when the rear wheels of the motor vehicle pass onto the raised portions 19 that the driver of the motor vehicle has his car positioned properly upon the turntables 3 and 4.

In addition to the guide thus provided by the raised portion 19 of the surface of the turntable, the side members 20 of the hydraulic hoist 16 serve as visual indicators to guide the operator of the motor vehicle when driving the motor vehicle onto the turntables 3 and 4.

The spread of the side members 20 being less than the transverse distance between the wheels of the motor vehicle, the operator of the motor vehicle merely drives his car over the side members 20 until the rear wheels of the motor vehicle pass upon the raised portion 19 of the turntable tops and the operator of the motor vehicle then knows that he is positioned correctly upon the turntables 3 and 4.

In order that the hydraulic hoist 16 may at all times be positioned in proper relation to the motor vehicle upon the turntables 3 and 4 irrespective of the position of rotation of the tables 3 and 4, the side members 20 of the hoist are embedded in slots or recesses 21 formed in the raised portions 19 of the top of the turntables 3 and 4. By this construction the hoists 16 are rotated with the turntables 3 and 4. To the rear of the lot 1 any suitable or desirable forms of buildings 22 may be constructed as are required for the maintenance and operation of the service station, and for the convenience of the public patronizing the service station.

Having fully described my invention, it is to be understood that I do not wish to be limited to the details herein set forth, but my invention is of the full scope of the appended claims.

I claim:

1. In a device of the class described, the combination of a substantially flat circular turntable, the upper surface of said table being substantially flush with the surrounding driveway to permit vehicles to drive on and off said table, means to rotate said table, a hoist mounted centrally of said table, and means to support the elevating portion of said hoist independently of the table when said portion is in elevated position, the hoist when lowered being constrained to rotation with the table, and there being sufficient clearance when the hoist is lowered to permit a vehicle to drive on to the turntable above the hoist.

2. In a device of the class described, the combination of a substantially flat circular turntable, the upper surface of said table being substantially flush with the surrounding driveway to permit vehicles to drive on and off said table, means to rotate said table, a hoist mounted centrally of said table, means to support the elevating portion of said hoist of said table when in lowered position, and means to support the elevating portion of said hoist independently of the table when said portion is in elevated position, the hoist when lowered being constrained to rotation with the table, and there being sufficient clearance when the hoist is lowered to permit a vehicle to drive on to the turntable above the hoist.

3. In a device of the class described, the combination of a substantially flat circular turntable, the upper surface of said table being substantially flush with the surrounding driveway to permit vehicles to drive on and off said table, means to rotate said table, a hoist mounted centrally of said table, and means to support the elevating portion of said hoist independently of the table when said portion is in elevated position, said elevating portion of the hoist being rotatable independently of the table when in elevated position, and the hoist when lowered being constrained to rotation with the table, and there being sufficient clearance when the hoist is lowered to permit a vehicle to drive on to the turntable above the hoist.

4. In a service station, the combination of a relatively narrow service station lot, of a pair of closely associated turntables positioned thereon in front and rear relation, a distributing station positioned between the turntables, and means for rotating the turntables whereby said tables may be positioned at such an angle with reference to said distributing station as to allow a vehicle approaching said tables from a position in advance of the front table to move on to the rear table from one side of and leave from the other side of said distributing station, the relative widths of tables and lot requiring passage of at least part of the vehicle over the tables in entering and leaving.

5. In a service station, the combination of a turntable having a vehicle path thereon, a relatively narrow lot having a common entrance and exit and upon which the turntable is mounted, a distributing station positioned on said lot adjacent said turntable, means to rotate the turntable with relation to the distributing station to position a vehicle which has been driven onto the turntable from one side of the distributing station for service from the distributing station, and whereby the path on said table will be positioned in a direction extending by the other side of the distributing station to allow the vehicle to leave the lot from said other side of the distributing station through the common entrance and exit, the relative widths of the lot and turntable being such as to require the rotation of the turntable with the vehicle thereon in order that the vehicle may be turned around.

6. In a service station, the combination of a turntable, means on the turntable to guide a motor vehicle thereon, a distributing station adjacent the turntable, a relatively narrow lot having a common entrance and exit upon which the turntable is positioned, means for rotating the turntable to position the opposed ends of the vehicle in servicing position relative to the distributing station and whereby the vehicle guide on said table may be positioned at such an angle with reference to the distributing station as to allow the vehicle to pass the distributing station in a forwarding direction in leaving the lot through the common entrance and exit, the relative widths of the lot and turntable being such as to require the location of the turntable with the vehicle thereon in order that the vehicle may be turned around.

7. In a service station, the combination of a turntable having a circular top, means on the circular turntable top to guide a motor vehicle thereon, a distributing station adjacent the turntable top, a relatively narrow lot having a common entrance and exit upon which the turntable is mounted, means for rotating the turntable to position an end of the vehicle adjacent the distributing station for service therefrom, means on the surface of the turntable for indicating when the vehicle is positioned on the top thereof and whereby said turntable may be positioned at an angle with reference to said distributing station to allow the vehicle on leaving the lot to pass the distributing station under forward direction of motion and through the common entrance and exit, the relative widths of the lot and turntable being such as to require the location of the turntable with the vehicle thereon in order that the vehicle may be turned around.

8. In a service station, the combination of a relatively narrow lot having a common entrance and exit, a turntable, a hoist mounted axially of the turntable, means for rotating the turntable, a distributing station adjacent the turntable, the relative widths of the lot and turntable being such as to require the rotation of the turntable and hoist when a vehicle is positioned thereon to enable the vehicle to be turned end for end for service from the distributing station, and to position an end of the vehicle when on said hoist with reference to said distributing station for service therefrom, and to enable the vehicle to approach and leave said station moving forwardly through the common entrance and exit.

9. In a service station, the combination of a relatively narrow lot having a common entrance and exit, a turntable positioned on the lot, a distributing station adjacent the turntable, the turntable having a top, a raised portion on the top of the turntable and a hoist mounted on the turntable top embedded in the raised portion thereof to turn therewith, means for rotating the turntable whereby said table may be positioned at an angle with reference to the said distributing station to enable the vehicle when on said hoist to be serviced from the distributing station when the hoist is elevated, and to permit the vehicle when the hoist is lowered to pass from the lot by the distributing station through the common entrance and exit.

10. In a service station, the combination of a relatively narrow service station lot, a pair of turntables located on said lot one to the rear of the other, a distributing station between the turntables, and means for independently rotating the turntables with relation to the distributing station, whereby one of said tables may be positioned at such an angle to said distributing station as to allow a vehicle to move onto the rear table and leave said table on either side of said distributing station, the relative widths of tables and lot requiring passage of at least part of the vehicle over the tables in entering and leaving, the vehicles being adapted to enter and pass on one side of the lot and leave on the other side of the lot.

11. In a service station, the combination of a relatively narrow lot having a common entrance and exit, a pair of closely associated turntables located on the lot, one to the rear of the other, a distributing station positioned between the turntables, hoisting means positioned axially of said turntables and adapted to rotate with the turntables, means for rotating the turntables to enable the vehicles positioned upon the hoist thereof to be turned end for end for service from the distributing station, and to position the forward ends of the vehicles when the hoists are lowered so as to permit the vehicles in leaving the service station to be driven forwardly through the common entrance and exit.

12. In a service station, the combination of a relatively narrow lot having a common entrance and exit, a pair of closely associated turntables positioned on the lot, one to the rear of the other, a distributing station between the turntables, hoisting means axially of the turntables adapted to be rotated with the turntables, means on the turntables for indicating when motor vehicles are positioned thereon, and whereby a vehicle on one of said tables may be positioned at an angle with reference to said distributing station, means for rotating the turntable to position an end of the vehicle when on said hoist with reference to said distributing station for service therefrom, and to position the vehicle on said turntable to permit the vehicle to leave said lot when moving forwardly through the common entrance and exit.

13. In a service station, the combination of a relatively narrow lot having a common entrance and exit, a pair of closely associated turntables located on said lot, one to the rear of the other, a distributing station between the turntables, hoisting means axially of said turntables and adapted to be rotated with the turntables, means on the turntables to indicate when the motor vehicles are positioned thereon, means for independently rotating the turntables to position the respective ends of the motor vehicles when elevated by said hoists with respect to the distributing station for service therefrom and to position said motor vehicles when the hoists are lowered to permit the vehicles to leave the said lot through the common entrance and exit.

14. In a service station, the combination of a relatively narrow service station lot, a pair of closely associated turntables located on said lot one to the rear of the other, a distributing station between the turntables in position closely adjacent the peripheries of the turntables, and means for independently rotating the turntables with relation to the distributing station and for returning the turntables to their initial position, whereby one of said tables may be positioned at an angle to said distributing station to allow a vehicle to move onto said table and leave said table on either side of said distributing station, the relative widths of tables and lot requiring passage of at least part of the vehicle over the tables in entering and leaving, and the vehicles adapted to enter and pass on one side of the lot and leave on the other side of the lot.

15. In a service station, the combination of a relatively narrow service station lot, a pair of turntables closely associated located on said lot one to the rear of the other, a distributing station between the turntables in position adjacent the turntables, means for rotating the front turntable through 180°, and means for rotating the rear turntable less than 180° to allow motor vehicles going onto and leaving the rear turntable to pass on the sides of a motor vehicle positioned on the front turntable, whereby one of said tables may be positioned at an angle to said distributing station to allow vehicles to move onto said table and leave said table on either side of said distributing station, the relative widths of tables and lot requiring passage of at least part of the vehicle over the tables in entering and leaving, and the vehicles adapted to enter and pass on one side of the lot and leave on the other side of the lot.

16. In a service station, the combination of a relatively narrow service station lot, a pair of closely associated turntables located on said lot one to the rear of the other, a distributing station between the turntables and adjacent the turntables, means for rotating the front turntable to turn a motor vehicle thereon around so that it may leave the service station, and means for rotating the rear turntable to allow motor vehicles going onto and leaving the rear turntable to pass on the sides of the motor vehicle positioned on the front turntable, whereby one of said tables may be positioned at an angle with reference to said distributing station to allow said vehicles to move onto said table from one side of said distributing station, the relative widths of tables and lot requiring passage of at least part of the vehicle over the tables in entering and leaving, and the vehicles adapted to enter and pass on one side of the lot and leave on the other side of the lot.

JOSEPH ALEXANDER DUNN.